(12) United States Patent
Rehrig

(10) Patent No.: US 6,534,747 B1
(45) Date of Patent: Mar. 18, 2003

(54) WELDING TORCH AND HANDLE

(76) Inventor: Richard B. Rehrig, P.O. Box 1870, San Marcos, CA (US) 92079

( * ) Notice: Subject to any disclaimer, the term of this patent is extended or adjusted under 35 U.S.C. 154(b) by 0 days.

(21) Appl. No.: 09/867,926

(22) Filed: May 30, 2001

(51) Int. Cl.[7] .............................. B23K 9/32; B25G 3/26
(52) U.S. Cl. ............ 219/137.31; 219/144; 16/DIG. 12; 16/421; 16/422; 16/429; 81/489
(58) Field of Search .................................. 219/134, 144; 74/551.9; 29/278; 81/177.2, 177.1, 489; 16/DIG. 12, 421, 422, 429, 405, 430, 431

(56) References Cited

U.S. PATENT DOCUMENTS

| | | | | |
|---|---|---|---|---|
| 4,892,276 A | * | 1/1990 | Alessio | 16/231 |
| 4,964,192 A | * | 10/1990 | Marui | 16/421 |
| 4,969,231 A | * | 11/1990 | Mader et al. | 16/421 |
| RE34,194 E | * | 3/1993 | Stowell et al. | 16/111 R |
| 5,322,334 A | * | 6/1994 | Hammer | 15/144.4 |
| 5,403,987 A | * | 4/1995 | Rehrig | 219/137.51 |
| 5,529,148 A | * | 6/1996 | O'Leary | 16/49 |
| 5,571,427 A | * | 11/1996 | Dimock et al. | 219/136 |
| 6,399,913 B1 | * | 6/2002 | Sammons et al. | 219/144 |

* cited by examiner

Primary Examiner—M. Alexandra Elve
Assistant Examiner—Kevin McHenry
(74) Attorney, Agent, or Firm—Holland & Knight LLP

(57) ABSTRACT

An improved welding torch wherein the connection between the torch body and handle is a frictional engagement and prevents any relative rotational movement of the torch handle and body while additionally providing an indexing mechanism for selective alignment of the torch body with a variety of surface contours on the torch handle. The torch body includes a plurality of radially projecting handle engagement ribs thereon and a radially projecting indexing pin receivable in one or more axial grooves in an end wall of the handle. The grooves are radially aligned with different surface contours on the handle such that when the handle is in place on the torch body, the ribs frictionally engage the handle and the indexing pin is disposed in one of the grooves preventing inadvertent relative rotation of the torch handle and body and aligning a selected handle contour with the torch body.

16 Claims, 1 Drawing Sheet

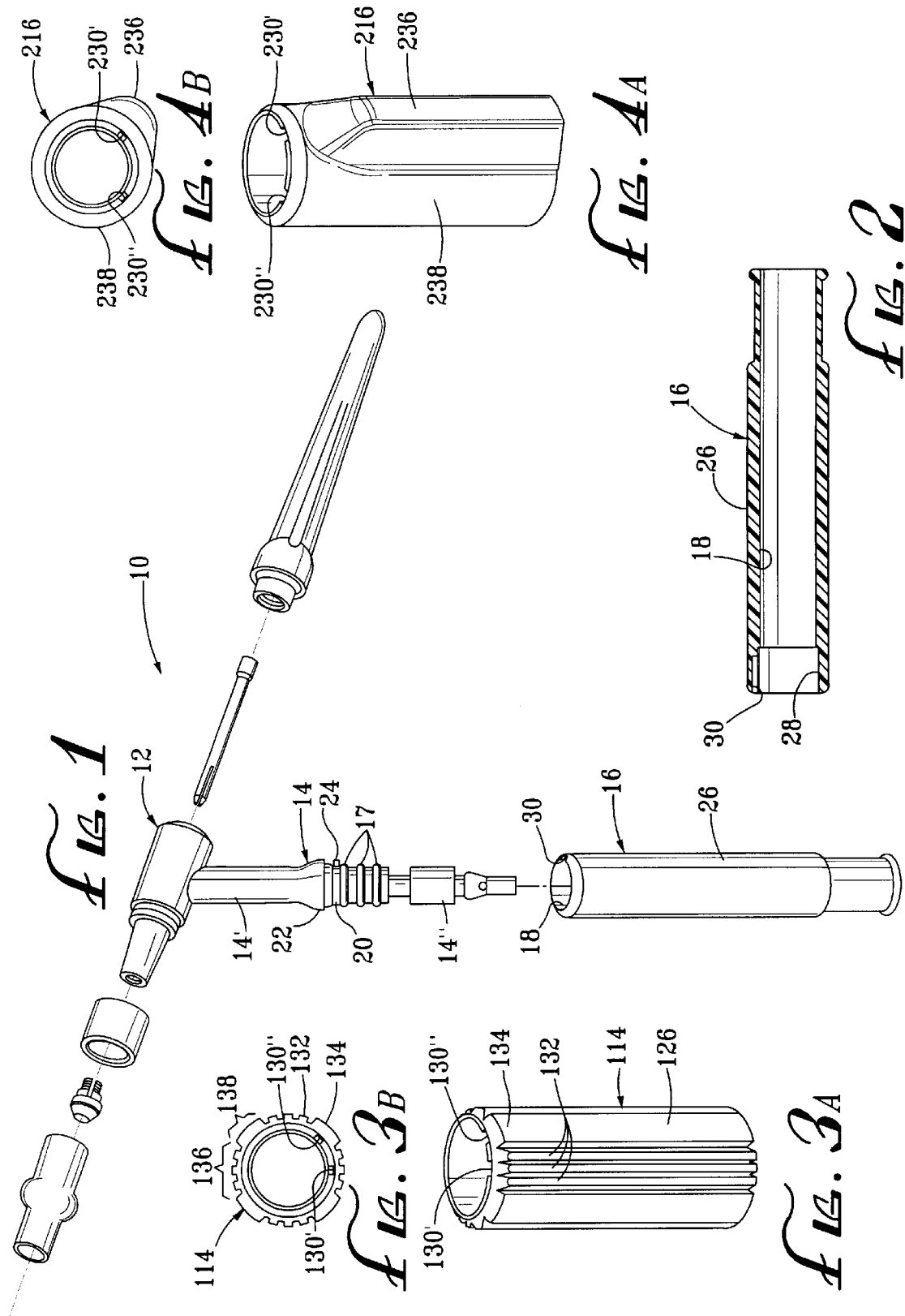

WELDING TORCH AND HANDLE

BACKGROUND OF THE INVENTION

The present invention relates to GTAW (gas tungsten arc welding) and TIG (tungsten inert gas) welding torches, and more particularly, to an improved method of construction that fixes the handle to the torch body in a more advantageous manner. Traditionally, the welding torch body was constructed using a rigid plastic insulation material such as phenolic or nylon. The rigid plastic insulation connected to the handle via a threaded connection that was also made from a plastic material. The plastic insulation was subject to physical limitations including melting, cracking, chipping, and in some cases, electrical breakdown.

More recently, welding torch bodies have been comprised of rubber insulation, usually silicone rubber, which has high heat resistance. The rubber insulation resists cracking and chipping, and has excellent insulation properties. The rubber insulation also allows the welder, as the operator of the welding torch, to bend or form the torch body to a more comfortable working position. The torch body is more effectively insulated with rubber than with plastic because the rubber insulation is less electrically conductive than a similar plastic insulation component.

The handle connection of a rubber insulated torch body is a friction-type connection. The rubber torch body is molded with a series of rings, or "ribs," slightly larger than the bore of the handle. When the handle is pushed onto the rubber ribs, the smooth bore compresses the rubber torch body ribs, and the resulting frictional engagement holds the handle in place. Such a securement of the handle is adequate for many applications and has several advantages. It allows the handle to remain cooler because the handle is not threaded onto a metal torch component that becomes heated during welding. It utilizes a simple push-on connection that is economical to manufacture and, when used with handles having variations in surface textures or contours, it allows the welder to rotate the handle on the torch body, giving the torch a different feel in the welder's hand. By changing the orientation of the handle or the feel of the torch handle, the welder can reduce the strain and fatigue on his or her hand during a lengthy welding operation.

There are times, however, when it is important that the welding torch not rotate relative to the handle. For example, in a procedure known as "walking the cup," two pipes are welded together end-to-end. The operator first cuts the ends of both pipes at an angle and places the two ends together to form an outward-facing v-shaped groove. The operator then places the torch-mounted ceramic nozzle (called a "cup") in the V-shaped groove of the pipe joint and moves the torch around the circumference of the groove by rocking the nozzle ("walking") from side to side. The weld puddle coming from the welding torch penetrates the edges or walls of the weld joint, but preferably, does not enter the interior cavity of the pipe. With a normal rubber torch body and a friction-applied handle, the operator must apply a modest pressure to hold the nozzle on the pipe joint while "walking the cup." If the handle moves or rotates, the weld puddle can be affected, resulting in a faulty weld deposit. The faulty weld must be corrected, which is an expensive and time-consuming process.

The welding torch is typically hand-held by an operator. The operator often holds the handle of a welding torch for extended periods of time whether "walking the cup" or performing other welding tasks. This can be quite tiresome and create joint strain on the operator's hand, arm, and back. Further, the operator often must adjust the positioning of the torch or his or her own physical position in relation to the welding surface. This is particularly true when welding two pipes together. Thus, there is a need both for the adjustability of the handle provided by a friction-type connection and for a secure attachment which prevents inadvertent relative movement of the torch head and body.

It would be highly desirable to provide a welding torch that retained the favorable insulating properties and ease of adjustability of a rubber-insulated torch body and frictionally engaged handle but provided a securement that prevented unintended relative movement of the torch head and body. The welding torch of the present invention obtains these results. It would also be desirable for the welder to have a selection of handles with different surface contours, such that an operator could choose both the specific grip on a given handle for a particular torch or job or readily substitute one contoured handle for another, thereby enhancing the comfort and precision of the welding operation. The welding torch of the present invention allows for such selection and substitution.

SUMMARY OF THE INVENTION

Briefly, the welding torch of the present invention includes a frictional connection between an insulated torch body and the torch handle that prevents any inadvertent relative rotational movement therebetween. The torch body defines a first portion extending from the torch head and a second extended portion that carries the torch handle and frictionally engages the interior bore of the handle. An indexing member projects radially from the second portion of the handle that is adapted to be received within an axially extending groove formed in an inner end portion of a hollow handle upon the handle being pushed onto the torch body. When the handle is pushed onto the torch body, the handle is secured by frictional engagement and the indexing member on the body fits securely within the handle groove, preventing any inadvertent relative rotation of the torch body and handle during use.

In an alternate embodiment of the invention, the exterior surface of the torch handle is provided with at least two different contours that extend along the outer surface thereof and at least two axially extending grooves are provided in the inner end portion of the handle wherein each groove is radially aligned with one of the different surface contours. By selectively aligning one of the grooves on the torch handle with the indexing member on the torch body and urging the torch handle over the extended portion of the torch body such that the indexing member is received in that groove, the handle is secured on the torch body and the contour aligned with that groove is axially aligned with the torch body. By varying the groove into which the indexing member is inserted, the handle contour aligned with the torch body is varied. By varying the axial alignment of the contour of the handle with the torch body, the torch operator can reduce the strain and fatigue on his or her hand during use. In addition, multiple handles having different surface contours can be provided to give the operator a variety of comfortable gripping surfaces, based on the welding job requirements and preferences of the operator.

It is therefore the principal object of the present invention to provide an improved welding torch handle attachment.

It is another object of the present invention to provide a frictional engagement welding torch handle attachment that prevents inadvertent relative rotation of the torch handle and torch body during use.

It is a further object of the present invention to provide a welding torch having a torch handle secured on the torch body by frictional engagement that defines different surface contours and allows the operator to selectively vary the axial alignment of the contour of the torch handle with the torch body while preventing inadvertent relative rotation therebetween during use.

It is a still further object of the present invention to provide a welding torch assembly including a plurality of readily interchangeable welding torch handles having different surface contours that can be selectively secured on the torch body by frictional engagement such that inadvertent relative movement of the secured handle and torch body is prevented during use.

It is still another object of the present invention to provide a welding torch that minimizes strain and fatigue on the operator during use.

It is yet another object of the present invention to provide a highly versatile torch handle attachment which is of simple construction and economical to manufacture.

These and other objects and advantages of the present invention will become readily apparent from the following detailed description taken in conjunction with the accompanying drawings.

BRIEF DESCRIPTION OF THE DRAWINGS

FIG. 1 is an exploded view of the welding torch of the present invention.

FIG. 2 is a cross-sectional view of the welding torch handle.

FIG. 3A is a partial perspective of a torch handle with an axially ridged surface contour and wide, smooth area with constant radius.

FIG. 3B is a top plan view of the handle in FIG. 3A.

FIG. 4A is a partial perspective of a handle with an axially raised contour and a smooth area with constant radius.

FIG. 4B is a top plan view of the handle in FIG. 4A.

DETAILED DESCRIPTION OF THE PREFERRED EMBODIMENT

Referring now in detail to the drawings, the welding torch 10 of the present invention comprises a torch head 12, torch body 14 and handle 16. The torch body 14 is generally of a conventional configuration and defines a first portion 14' extending from the torch head 12 and a second extended portion 14" that carries the torch handle 16. The torch body 14 is formed of a rubber insulating material and the extended portion 14" is provided with radially projecting ribs 17 for frictional engagement with the interior wall 18 of torch handle 16. A metal collar 20, preferably formed of brass or copper is secured about the extended portion 14" of torch body 14 proximate an annular shoulder 22 formed by the extended end of the first torch body portion 14'. An indexing pin 24, preferably formed of steel, is secured to and projects radially from collar 20.

The hollow torch handle 16, is preferably formed of a plastic material and defines a smooth cylindrical inner wall 18, an outer handle gripping surface 26 and an inner end portion 28. While the gripping surface 26 is shown as being cylindrical in FIG. 1, in the first embodiment of the invention, surface 26 could be of any desired configuration. The inner end portion 28 of the torch handle 16 has a groove 30 formed therein extending axially along the handle through wall 18. Groove 30 is sized and positioned such that upon the torch handle 16 being pushed onto the extended portion 14" of the torch body 14, the indexing pin 24 is snugly received within the groove 30. The torch handle 16 is then held on the torch body by the frictional engagement of interior wall 18 of the handle and the radially projecting ribs 17 on the torch body and the indexing pin 24 is disposed snugly within groove 30 preventing any relative rotational motion of the welding torch body 14 and torch handle 16 during use.

A second embodiment of the invention is illustrated in FIGS. 3A–4B. In the second embodiment, the configuration of the torch head and body is unchanged. However, the torch handle 114 is provided with differences in contour extending along the exterior gripping surface 126 of the torch handle 114. For example, as seen in FIG. 3A, the outer surface of the handle could define series of closely spaced longitudinal ribs 132 that are circumferentially spaced about smooth areas 134 of constant radius. The ribbed areas define a first contour 136 on the surface of the torch handle and the smooth areas define a second contour 138. The torch handle 114 also defines a pair of axially extending grooves 130' and 130" therein that are each identical in configuration to groove 30 of the prior embodiment. However, groove 130' is radially aligned with the first contour 136 of handle 114 and groove 130" is radially aligned with the second contour 138. When the torch handle 114 is pushed onto the extended portion 14" of the torch body, the indexing pin 24 is snugly received in one of grooves 130' or 130". Thus, the handle 114 can be slidably attached so that the desired particular surface contour is aligned with the torch body and torch head. The aligned contour can be readily changed by simply pulling the handle off the torch body, aligning the other groove in the handle (130' or 130") with the indexing pin 24 and resecuring the handle. Thus, the operator can quickly and easily change the feel of the torch on his or her hand to relieve strain and fatigue. In addition, several torch handles having a wide variety of surface contours can be provided that can be quickly interchanged by simply pulling a first handle off of the torch body and attaching a second handle.

FIG. 4A illustrates an example of another handle configuration that could be employed in the second embodiment of the present invention. As seen therein, the torch handle 216 defines an axially extending raised first contour 236 and a smooth second contour 238 of constant radius. A first groove 230' is radially aligned with the first raised contour 236 and a second groove 230" is radially aligned with a midpoint of the second contour 238. It is to be understood that depending on the contours defined by the torch handle, the handle could be provided with more than two indexing grooves and the number of grooves provided need not equal the number of areas of different contour as a variation of the positioning of a single contour in the operator's hand can change the feel of the torch handle. The inner end portion of the handle, if desired, also could contain three or more grooves to provide an even greater number of gripping positions for the particular surface contour or contours of the handle.

It should be noted that the location of the pin and groove indexing members could be reversed in any of the above-described embodiments of the present invention. In such modifications, the indexing pin, which defines a key, could be molded into the inner end portion of the handle and one or more grooves could be machined into the metal collar 20 on the torch body. With such a reversal of parts, the torch body and torch handle would still function in the same way as in the previously discussed embodiments to prevent relative rotation of the torch body and torch handle and provide for selective alignment of a torch handle contour with the torch body.

Various other changes and modifications may be made in carrying out the present invention without departing from the spirit and scope thereof. Insofar as such changes and modifications are within the purview of the appended claims, they are to be considered as part of the present invention.

What is claimed:

1. In a welding torch of the type having a torch body and a hollow torch handle disposed about an extended portion of the torch body and held thereon by frictional engagement therewith, the improvement comprising:

an indexing member rigidly affixed to said extended portion of said torch body proximate an inner end thereof and projecting radially therefrom; and an axially extending indexing groove disposed in an inner end portion of said handle, said groove defining an open end and a closed end and being adapted to receive said indexing member through said open end thereof upon said handle being slidably disposed about said extended portion of said torch body, whereby relative rotational movement of said handle and torch body is prevented without preventing axial separation of said handle and torch body.

2. In a welding torch of the type having a torch body and a hollow torch handle disposed about an extended portion of the torch body and held thereon by frictional engagement therewith, the improvement comprising:

a collar rigidly affixed to said torch body proximate an inner end of said extended portion of said body;

an indexing pin carried by said collar and projecting radially therefrom; and an axially extending indexing groove disposed in an inner end portion of said handle, said groove defining an open end and a closed end and being adapted to receive said pin through said open end thereof upon said handle being slidably disposed about said extended portion of said torch body and said collar, whereby relative rotational movement of said handle and torch body is prevented without preventing axial separation of said handle and torch body.

3. In a welding torch of the type having a torch body and a hollow torch handle disposed about an extended portion of the torch body and held thereon by frictional engagement therewith, the improvement comprising:

an indexing member rigidly affixed to said extended portion of said torch body proximate an inner end thereof and projecting radially from therefrom;

a plurality of different outer surface contours defined by said handle and extending axially along said handle; and a plurality of axially extending indexing grooves disposed in an inner end portion of said handle, each of said grooves being in radial alignment with one of said different outer surface contours and adapted to receive said indexing member upon said handle being slidably disposed about said extended portion of said torch body with said member in axial alignment therewith, whereby a selected surface contour can be aligned with said torch body and relative rotational movement of said handle and said torch body is prevented.

4. The improvement of claim 3 wherein said outer surface contours comprise at least one axially ridged area and at least one substantially smooth area of constant radius.

5. A welding torch comprising a torch head, a torch body extending from said head and defining a plurality of radially projecting ribs on an extended portion thereof, an indexing member carried by said extended portion of said body proximate said ribs and a hollow torch handle carried by said extended portion of said body, said handle defining a cylindrical inner wall in frictional engagement with said ribs and an axially extending groove in one end of said wall, said groove defining an open end and a closed end, said indexing member projecting into said groove upon said handle being slidably disposed about said extended end portion of said torch body, whereby said handle is maintained on said body by said frictional engagement and relative rotational movement between said body and said handle is prevented by said indexing member without preventing axial separation of said handle and torch body.

6. The welding torch of claim 5 including a collar extending about and rigidly affixed to said extended portion of said torch body and wherein said indexing member defines a radially projecting pin carried by said collar.

7. A welding torch comprising a torch head, a torch body extending from said head and defining a plurality of radially projecting ribs on an extended portion thereof, an indexing member carried by said extended portion of said body proximate said ribs and a hollow torch handle carried by said extended portion of said body, said handle defining a cylindrical inner wall in frictional engagement with said ribs, a plurality of axially extending indexing grooves in one end of said wall and a plurality of different outer surface contours extending axially along said handle and wherein each of said grooves is in radial alignment with one of said different outer surface contours and is adapted to receive said indexing member upon said handle being slidably disposed about said extended portion of said torch body with said indexing member in axial alignment therewith, whereby a selected outer surface contour can be aligned with said torch body and relative rotational movement between said body and said handle is prevented.

8. The welding torch of claim 7 including a collar extending about and rigidly affixed to said extended portion of said torch body and wherein said indexing member defines a radially projecting pin carried by said collar.

9. The welding torch of claim 7 wherein said outer surface contours comprise at least one axially ridged area and at least one substantially smooth area of constant radius.

10. In a welding torch of the type having a torch body and a hollow torch handle disposed about an extended portion of the torch body and held thereon by frictional engagement therewith, the improvement comprising:

an indexing member rigidly affixed to and projecting radially from either said extended portion of the said torch body or an inner end portion of said torch handle; and an axially extending groove disposed either in an inner end portion of said torch handle or in said extended portion of said torch body, said groove defining an open end and a closed end such that upon said handle being slidably disposed about said extended portion of said torch body, said indexing member is received within said groove through said open end thereof and relative rotational movement of said handle and said torch body is prevented without preventing axial separation of said handle and torch body.

11. In a welding torch of the type having a torch body and a hollow torch handle disposed about an extended portion of the torch body and held thereon by frictional engagement therewith, the improvement comprising:

an indexing member rigidly affixed to and projecting radially from either said extended portion of the said torch body or an inner end portion of said torch handle;

a plurality of different outer surface contours defined by said handle and extending axially along said handle; and a plurality of axially extending indexing grooves disposed either in an inner end portion of said handle or in said extended portion of said torch body such that upon said handle being slidably disposed about said extended portion of said torch body, each of said grooves is in radial alignment with one of said different outer surface contours and said indexing member is disposed within one of said grooves whereby a selected surface contour is aligned with said torch body and relative rotational movement of said handle and said torch body is prevented.

12. The improvement of claim 11 wherein said outer surface contours comprise at least one axially ridged area and at least one substantially smooth area of constant radius.

13. The improvement of claim 11 wherein said outer surface contours comprise at least one axially raised area and a substantially smooth area of constant radius.

14. In a welding torch of the type having a torch body and a hollow torch handle disposed about an extended portion of the torch body and held thereon by frictional engagement therewith, the improvement comprising:

a collar rigidly affixed to said torch body proximate an inner end of said extended portion of said body;

an indexing member carried by and projecting radially from either said collar or an inner end portion of said torch handle; and a plurality of axially extended grooves disposed either in an inner end portion of said handle or in said collar such that upon said handle being slidably disposed about said extended portion of said torch body, each of said grooves is in radial alignment with one of said different outer surface contours and said indexing member is disposed within one of said grooves whereby a selected surface contour can be aligned with said torch body and relative rotational movement of said handle and said torch body is prevented.

15. In a welding torch of the type having a torch body and a hollow torch handle disposed about an extended portion of the torch body and held thereon by frictional engagement therewith, the improvement comprising:

a collar rigidly affixed to said torch body proximate an inner end of said extended portion of said body;

an indexing pin carried by and projecting radially from either said collar or an inner end portion of said torch handle; and a plurality of different outer surface contours defined by said handle and extending axially along said handle; and a plurality of axially extending grooves disposed either in an inner end portion of said handle or in said collar such that upon said handle being slidably disposed about said extended portion of said torch body, each of said grooves is in radial alignment with one of said different outer surface contours and said indexing pin is disposed within one of said grooves whereby a selected surface contour is aligned with said torch body and relative rotational movement of said handle and said torch body is prevented.

16. The improvement of claim 15 wherein said outer surface contours comprise at least one axially ridged area and at least one substantially smooth area of constant radius.

* * * * *